US008775587B2

(12) United States Patent
Goff et al.

(10) Patent No.: US 8,775,587 B2
(45) Date of Patent: Jul. 8, 2014

(54) PHYSICAL NETWORK INTERFACE SELECTION TO MINIMIZE CONTENTION WITH OPERATING SYSTEM CRITICAL STORAGE OPERATIONS

(75) Inventors: Mark Harrison Goff, Stewartville, MN (US); Michael Anthony Migliacio, Rochester, MN (US); Randall Scott Nelson, Rochester, MN (US); Eric Gene Thiemann, Hayfield, MN (US)

(73) Assignee: International Business Machines Corporation, Armonk, NY (US)

( * ) Notice: Subject to any disclaimer, the term of this patent is extended or adjusted under 35 U.S.C. 154(b) by 1952 days.

(21) Appl. No.: 11/750,372

(22) Filed: May 18, 2007

(65) Prior Publication Data

US 2008/0288620 A1 Nov. 20, 2008

(51) Int. Cl.
*G06F 15/16* (2006.01)
*G06F 15/173* (2006.01)

(52) U.S. Cl.
USPC ............................ 709/223; 709/232; 709/240

(58) Field of Classification Search
USPC .................................................. 709/223, 240
See application file for complete search history.

(56) References Cited

U.S. PATENT DOCUMENTS

| 5,923,854 | A | 7/1999 | Bell et al. |
| 6,567,377 | B1 | 5/2003 | Vepa et al. |
| 6,590,861 | B1 | 7/2003 | Vepa et al. |
| 6,658,018 | B1 | 12/2003 | Tran et al. |
| 6,857,069 | B1 * | 2/2005 | Rissmeyer et al. ............... 713/2 |
| 6,965,930 | B1 | 11/2005 | Arrowood et al. |
| 7,231,462 | B2 | 6/2007 | Berthaud et al. |
| 7,240,098 | B1 * | 7/2007 | Mansee .......................... 709/212 |
| 7,484,029 | B2 | 1/2009 | Boyd et al. |
| 7,493,370 | B2 | 2/2009 | Bakke et al. |
| 2002/0072391 | A1 | 6/2002 | Itoh et al. |
| 2004/0141516 | A1 | 7/2004 | Lee |
| 2004/0255047 | A1 | 12/2004 | Larson et al. |
| 2005/0013441 | A1 * | 1/2005 | Klein ............................. 380/278 |
| 2005/0055700 | A1 | 3/2005 | Singler et al. |

(Continued)

FOREIGN PATENT DOCUMENTS

| JP | 2000348005 A | 12/2000 |
| JP | 2002197051 A | 7/2002 |

OTHER PUBLICATIONS

VMWare; "SAN Configuration Guide—ESX Server 3.0 and VirtualCenter 2.0"; Jun. 15, 2006; http://www.vmware.com/search/.*

(Continued)

*Primary Examiner* — Oscar Louie
*Assistant Examiner* — Lin Liu
(74) *Attorney, Agent, or Firm* — Wood, Herron & Evans, LLP

(57) ABSTRACT

An apparatus, program product and method dynamically select a physical network interface for use by an application running on a networked computer in a manner that attempts to minimize bandwidth contention between application-related operations and any operating system critical storage operations that may be initiated by an operating system resident on the same networked computer. The dynamic selection prioritizes at least one physical network interface that does not handle operating system critical storage operations over at least one physical network interface that does handle operating system critical storage operations, thus minimizing the likelihood of the application causing poor performance and/or failure of the operating system due to contention over limited network resources.

25 Claims, 2 Drawing Sheets

(56) References Cited

U.S. PATENT DOCUMENTS

| | | | |
|---|---|---|---|
| 2005/0066033 A1 | 3/2005 | Cheston et al. | |
| 2005/0216668 A1* | 9/2005 | Kobayashi et al. | 711/118 |
| 2006/0034190 A1 | 2/2006 | McGee et al. | |
| 2006/0047907 A1* | 3/2006 | Shiga et al. | 711/114 |
| 2006/0195617 A1 | 8/2006 | Arndt et al. | |
| 2006/0218388 A1* | 9/2006 | Zur et al. | 713/2 |
| 2007/0226360 A1* | 9/2007 | Gupta et al. | 709/230 |
| 2008/0028052 A1* | 1/2008 | Currid et al. | 709/222 |

OTHER PUBLICATIONS

Broadcast Engineering, "iSCI: The protocol for IP/Ethernet-based storage area networking", Penton Media, Inc. (Jul. 1, 2005), 3 pages.

Thiemann, Eric et al., U.S. Appl. No. 11/670,623, filed Feb. 2, 2007, entitled "Methods and Apparatus for Assigning a Physical Adapter to a Virtual Adapter".

IBM Corporation, "IBM BladeCenter and the Advantages of Diskless Blade Servers", Oct. 2006, pp. 1-15 URL: http://blades-central.com/white_papers/IBM%20BladeCenter%20and%20the.pdf>.

Dailey, A. et al, "Using iSCSI Multipathing in the Solaris 10 Operating System", Oct. 2005, pp. 1-12 URL: http://www.sun.com/blueprints/1205/819-3730.pdf>.

Credle et al, "IBM BladeCenter iSCSI SAN Solution", Aug. 2006, pp. 1-76 URL: http://www.redbooks.ibm.com/abstracts/redp4153.html>.

* cited by examiner

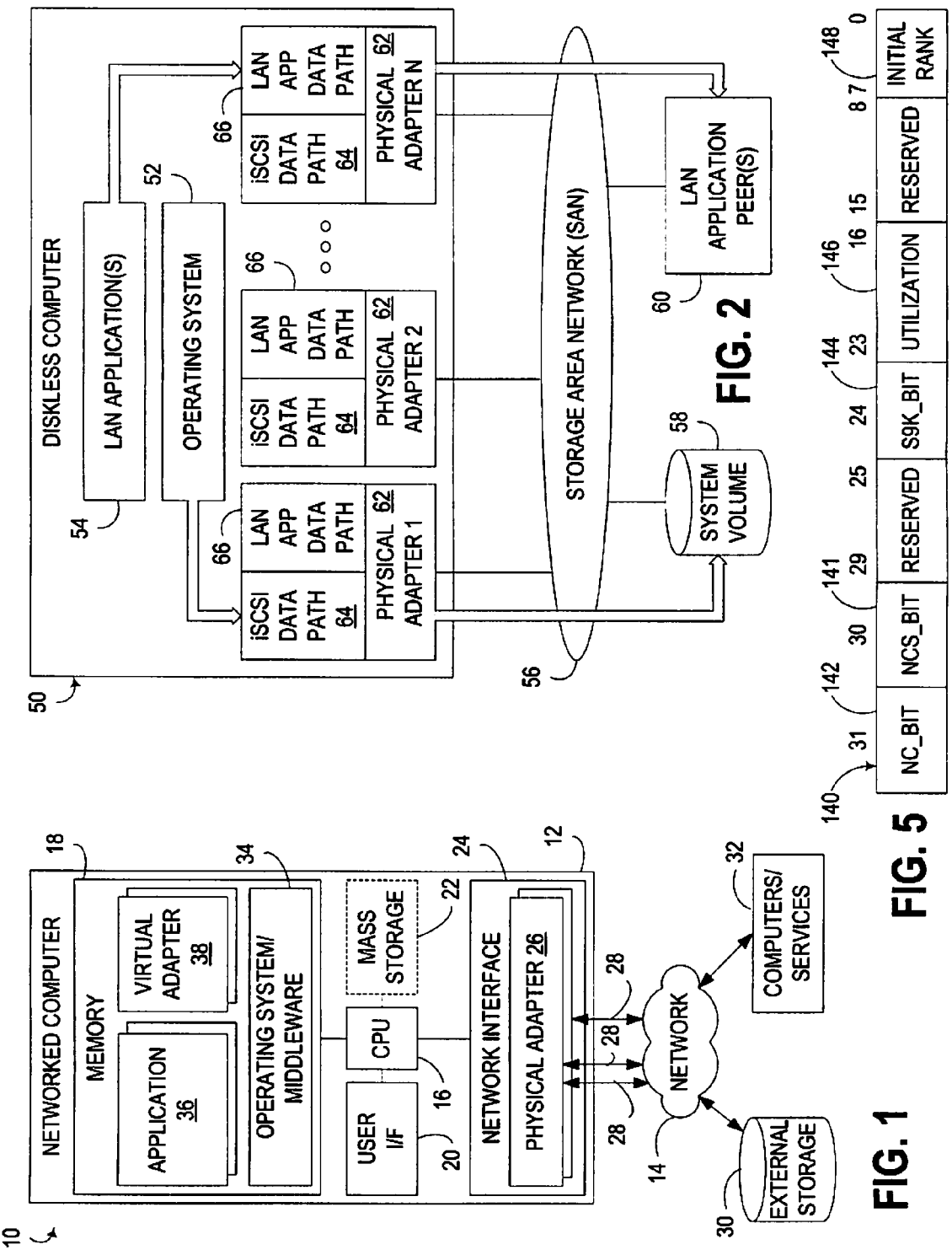

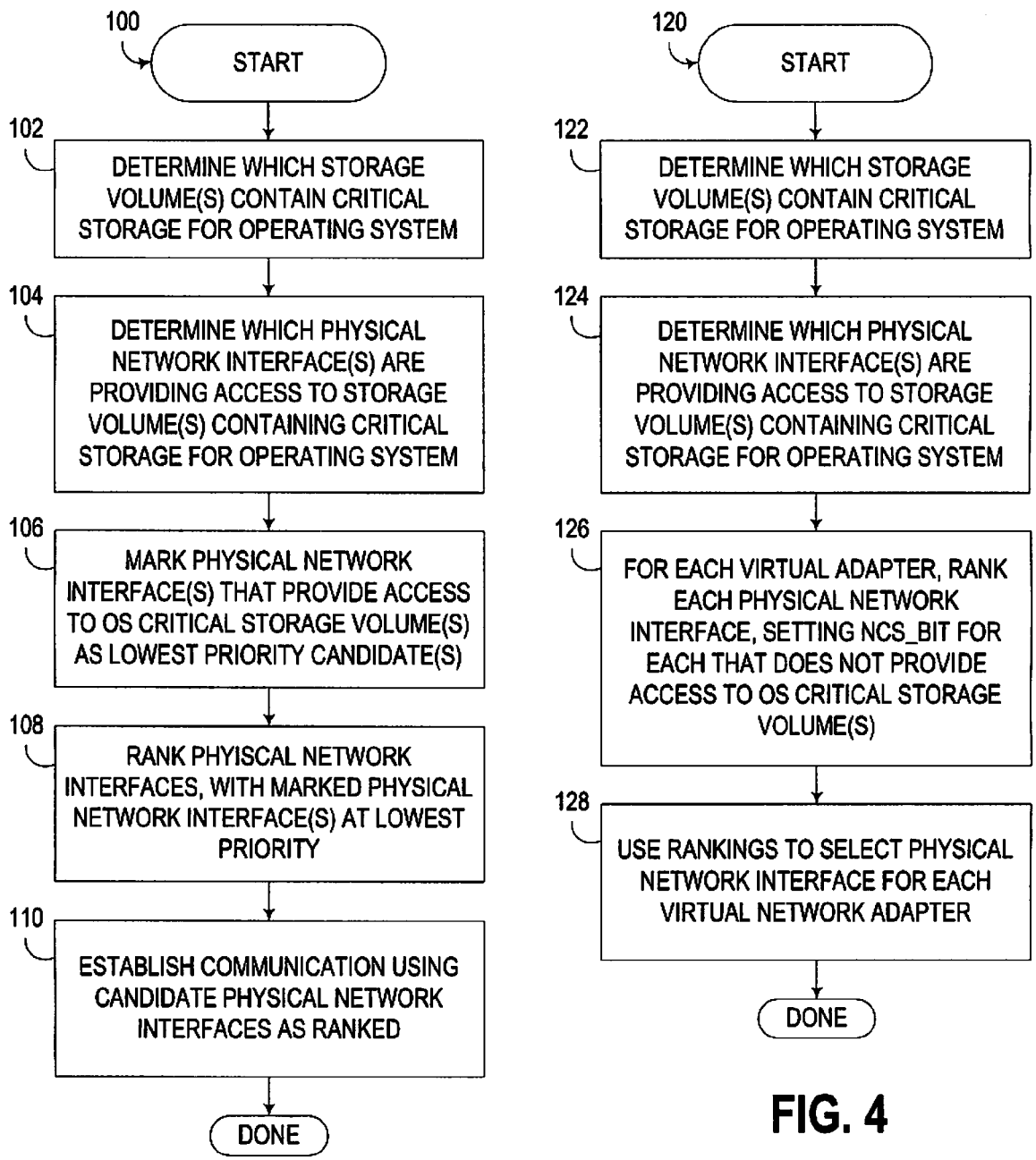

PHYSICAL NETWORK INTERFACE SELECTION TO MINIMIZE CONTENTION WITH OPERATING SYSTEM CRITICAL STORAGE OPERATIONS

CROSS-REFERENCE TO RELATED APPLICATIONS

This application is related to U.S. patent application Ser. No. 11/670,633, filed Feb. 2, 2007 by Eric Thiemann et al. and entitled "METHODS AND APPARATUS FOR ASSIGNING A PHYSICAL ADAPTER TO A VIRTUAL ADAPTER," which application is incorporated by reference herein in its entirety.

FIELD OF THE INVENTION

The invention is generally directed to networked computing systems, and in particular, to the selection of physical network interfaces for communicating data over a network in networked computing systems.

BACKGROUND OF THE INVENTION

Networking and communication can have a significant impact on the overall performance of a computer system. As computers have become increasingly interconnected to other computers, e.g., over private networks as well as public networks such as the Internet, often the costs associated with accessing remote resources over a network have a greater impact on overall system performance than those associated with processing and accessing local memory.

Many networks, e.g., Ethernet-based networks such as local-area networks (LAN's), wide-area networks (WAN's), wireless local-area networks (WLAN's), etc., have traditionally been used primarily to allow computers to communicate with other computers, such as web servers, file servers, database servers, and peer or client computers, as well as to access remote resources such as printers, increasingly these types of networks are also being used to access other types of resources, such as external storage devices. For example, some Ethernet-based networks can be configured to operate as storage-area networks (SAN's) to permit computers to access storage devices in much the same manner as local storage devices. Unlike file servers or network attached storage (NAS) devices, which access data at the file level, SAN devices are typically accessed at the block level, e.g., in the same manner as a local hard drive. Various types of SAN-based protocols have been developed, including, for example, Fibre Channel, iSCSI (which maps the SCSI protocol over TCP/IP), HyperSCSI (which maps the SCSI protocol over Ethernet) and ATA over Ethernet.

Computers typically communicate with a network over a physical network interface. A physical network interface provides a physical port to which a single network cable can be connected to connect the interface to the network, or in the case of a wireless interface, over which a single wireless connection can be maintained. In many instances, a physical network interface is implemented within a physical network adapter, provided either on the motherboard of the computer, or more typically, provided on a card or a USB device. In some instances, a physical network adapter can include multiple physical network interfaces, and furthermore, in some computers, multiple physical network adapters and/or multiple physical network interfaces may be provided, either to couple to the same network or to couple to different networks. By doing so, communication performance is often improved due to the ability to concurrently communicate data over multiple interfaces. In addition, reliability is often improved due to the ability to switch over to another physical network interface should one physical network interface fail or otherwise lose connectivity to the network.

With the addition of SAN's and other types of data traffic to networks, a physical network interface may be called upon to communicate a wide variety of data for different purposes. For example, data streams from LAN applications may be required to coexist with iSCSI data streams. When LAN application and iSCSI data streams coexist over the same physical network interface, however, there is the possibility of bandwidth contention between LAN traffic and iSCSI traffic. While bandwidth contention may simply slow the performance of some computers, in other computers, bandwidth contention can lead to unreliability and even system failures.

For example, some computers are implemented as "diskless" computers where no hard drive is resident within the computer itself. Instead, the data that is more traditionally stored locally on a hard drive is instead stored on a SAN-accessible device, and accessed using a SAN-compatible protocol such as iSCSI. The iSCSI data traffic therefore includes traffic to maintain critical storage such as the system volume, i.e., the disk volume where the operating system is located and typically where disk paging operations occur.

This type of data traffic, which is referred to herein as "operating system critical storage operations," can have a significant impact not only on the performance of the computer, but can also raise reliability concerns for the operating system. When operating system critical storage operations, however, are communicated over the same physical network interface as other data traffic such as LAN traffic, bandwidth contention can result. A risk exists that if there is too much LAN traffic at a given point in time, it may starve out some storage operations and cause poor performance, or in the worst case, may cause an operating system crash.

Therefore, a significant need exists in the art for a manner of minimizing bandwidth contention issues arising between operating system critical storage operations and other types of data traffic being communicated over a common physical network interface.

SUMMARY OF THE INVENTION

The invention addresses these and other problems associated with the prior art in providing an apparatus, program product and method that dynamically select a physical network interface for use by an application running on a networked computer in a manner that attempts to minimize bandwidth contention between application-related operations and any operating system critical storage operations that may be initiated by an operating system resident on the same networked computer. Typically, such dynamic selection prioritizes at least one physical network interface that does not handle operating system critical storage operations over at least one physical network interface that does handle operating system critical storage operations. By doing so, the likelihood of the application causing poor performance and/or failure of the operating system due to contention over limited network resources is minimized.

Consistent with one aspect of the invention, physical network interface selection is implemented within an apparatus of the type including a plurality of physical network interfaces that are each configured to communicate data over at least one network and a processing unit coupled to the plurality of physical network interfaces and configured to host an operating system and at least one application. Data is communicated in such an apparatus by directing operating system critical storage operations for the operating system over at least one of the plurality of physical network interfaces to access a network-accessible storage device, and dynamically selecting at least one of the plurality of physical network interfaces to communicate network data for the application by prioritizing at least one physical network interface that does not handle operating system critical storage operations over at least one physical network interface that does handle operating system critical storage operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of a networked computing system incorporating physical network interface selection consistent with the invention.

FIG. 2 is a block diagram of another networked computing system incorporating a diskless computer, and suitable for implementing physical network interface selection consistent with the invention.

FIG. 3 is a flowchart illustrating the program flow of an exemplary physical network interface selection routine capable of being executed by the computing system of FIG. 1 or 2.

FIG. 4 is a flowchart illustrating the program flow of another exemplary physical network interface selection routine capable of being executed by the computing system of FIG. 1 or 2 to map a virtual adapter to a physical network interface.

FIG. 5 is a block diagram of a rank data structure that may be assigned to a physical network interface by the selection routine of FIG. 4.

DETAILED DESCRIPTION

The embodiments described hereinafter address bandwidth contention issues in a networked computer by dynamically selecting physical network interfaces for use by applications running on the computer based upon which physical network interfaces are being used for operating system critical storage operations. In particular, physical network interfaces suitable for use by an application may be prioritized such that at least one physical network interface that does not handle operating system critical storage operations is prioritized over at least one physical network interface that does handle operating system critical storage operations. Based upon the prioritization, physical network interfaces may then be tried either sequentially or concurrently until a successful connection is established for the application.

In some embodiments, for example, any physical network interface that does not handle operating system critical storage operations may be prioritized over every interface that does handle such operations. In other embodiments, interfaces that do handle operating system critical storage operations may be de-prioritized relative to other physical network interfaces such that they are tried last among all available interfaces. In still another embodiment, prioritization may involve attempting to use a physical network interface that does handle operating system critical storage operations to handle non-operating system critical storage operations on behalf of an application only if no other physical network interface is available to communicate the data for the application. The prioritization or ranking of interfaces may also take into account other factors, such as current load or available bandwidth, suitability for certain tasks, load balancing or reliability concerns, etc.

Operating system critical storage operations may be considered to be any operations associated with critical storage requirements for an operating system. For example, operating system critical storage operations may be associated with read and write data traffic associated with one or more system volumes. Such operations may also be associated with traffic such as paging traffic associated with page swapping, traffic associated with retrieving program code for an operating system or any of its drivers, libraries or extensions, traffic associated with reading or updating operating system configuration or registry data, or practically any other type of operation that, if delayed, increases the risk of crashing or otherwise severely impacting the stability of the operating system.

Among other advantages, dynamic selection of physical network interfaces in the manner described herein typically provides for increased disk bandwidth due to the system volume being accounted for in the physical interface selection process, and does so in an automated manner that is not susceptible to human error as might otherwise occur were manual interface configuration attempted. In addition, as opposed to quality of service (QoS) approaches such as IEEE 802.3Q, no specialized networking hardware support is typically required.

Turning now to the Drawings, wherein like numbers denote like parts throughout the several views, FIG. 1 illustrates an exemplary networked computing system 10 suitable for implementing physical network interface selection consistent with the invention. FIG. 1, in particular, illustrates a networked computer or apparatus 12 coupled to a network 14. For the purposes of the invention, each computer 12 may represent practically any type of computer, computer system or other programmable electronic device, including, for example, a multi-user computer such as a mainframe computer, a server, a midrange computer, or a logically-partitioned computer. Moreover, computer 12 may be implemented using one or more networked computers, e.g., in a cluster or other distributed computing system. In the alternative, physical network interface selection consistent with the invention may be implemented within a single user computer or other programmable electronic device, e.g., a desktop computer, a laptop computer, a handheld computer, a cell phone, a set top box, etc.

Computer 12 typically includes a central processing unit 16 including at least one microprocessor coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 22 or on another computer coupled to computer 12. Computer 12 also typically receives a number of inputs and outputs for communicating information externally. For interface with a user or operator, computer 12 typically includes a user interface 20 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 10 may also include one or more mass storage devices 22, e.g., a floppy or other removable disk drive, a hard disk drive, a direct access storage device (DASD), an optical drive (e.g., a CD drive, a DVD drive, etc.), and/or a tape drive, among others. In addition, as will be discussed in greater detail herein, computer 12 may be implemented as a diskless computer system, whereby no mass storage device (or at least no hard disk drive) is incorporated in computer 12.

Furthermore, computer 10 may include a network interface 24 for interfacing computer 12 with one or more networks, such as network 14 (e.g., a LAN, a WAN, a storage area network (SAN), a wireless network, and/or the Internet, among others), to permit the communication of information with other computers and electronic devices. Network interface 24 typically includes one or more physical network adapters 26, each of which defining one or more physical network interfaces 28 with network 14. Various components may be accessible over network 14, e.g., external storage 30 and/or various computers and/or services, identified at 32.

It should be appreciated that computer 12 typically includes suitable analog and/or digital interfaces between CPU 16 and each of components 18, 20, 22 and 24 as is well known in the art. Other hardware environments are contemplated within the context of the invention.

Computer 12 operates under the control of an operating system 34 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 12 via network 14, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

As noted above computer 12 hosts an operating system 34, which may also be considered to include middleware and/or kernel components, if appropriate. Operating system 34 typically generates operating system critical storage operations, e.g., by accessing a system volume resident on external storage 30. Computer 12 also hosts one or more applications that may require access to networked resources, e.g., any of computers/services 32. One type of application, in this context, may be a virtual adapter 38, which in the illustrated embodiment is bound to a physical adapter 26 to provide network access to another application resident in computer 12.

Multiple physical network interfaces (diagrammatically represented at 28, and disposed in one or more physical adapters 26) are available in computer 12 for use by operating system 34 for operating system critical storage operations, as well as by applications 36 and virtual adapters 38. Consistent with the invention, these interfaces 28 are dynamically selected to minimize bandwidth contention between application data traffic and data traffic for operating system critical storage operations, by prioritizing any physical interfaces that do not handle operating system critical storage operations over any that do handle such operations, whenever an application requests to use a physical network interface to access a network resource.

In one embodiment, for example, dynamic selection of a physical network interface may be initiated in response to a request by an application to send data, a request to start a connection or conversation with a network resource, or a request to bind an application such as a virtual network adapter to a particular physical network interface such as a physical network port. To perform such selection, a query may be made to identify which physical network interface(s) being used for operating system critical storage operations such as system volume storage operations. Then, an ordered list of physical interfaces to try for the application may be created with the physical interface that is being used for system volume storage operations ordered last in the list. The list may then be used, in order, to determine a physical network interface to use for the application.

The aforementioned physical network interface selection may be used in a number of computing environments consistent with the invention. For example, as shown in FIG. 2, physical network interface selection consistent with the invention may be used in a diskless computer 50 having no local storage device resident therein. It will be appreciated that the invention may also be used in computers that do have some form of local storage device.

Computer 50 has an operating system 52 and one or more LAN applications 54 that each require access to a network 56 that includes, among other data traffic, storage area network (SAN) data traffic. While operating system 52 may also access other services, one primarily resource accessed by operating system 52 is a system volume resident on a network-accessible storage device 58. For the LAN applications 54, each typically accesses other types of resources, e.g., other LAN application peers 60.

In the embodiment of FIG. 2, computer 50 includes a plurality (N) of physical network interfaces, or adapters, 62, each supporting, in the least, an iSCSI data path 64 and a LAN application data path 66. To minimize bandwidth contention between the iSCSI and LAN application data paths 64, 66 in any given adapter 62, a physical network interface selection routine, such as routine 100 of FIG. 3, is used whenever a LAN application requires access to a physical network interface.

Routine 100 may be called in a number of different instances, e.g., whenever an application issues a request to communicate with another device over the network, e.g., a request to communicate data, a request to connect, or a request to bind a virtual adapter to a physical adapter. Routine 100 may also be called, for example, whenever a notification is received that operating system critical storage operations are now being accessed over a different physical network interface.

Routine 100 begins in block 102 by determining which storage volume(s) contain critical storage for the operating system, e.g., by calling a suitable operating system-provided API. Next, block 104 determines which physical network interface(s) are providing access to the storage volume(s) containing the critical storage for the operating system, e.g., by calling another operating system-provided API.

Once the physical network interfaces that access critical storage, and thus handle operating system critical storage operations, are determined, block 106 marks these interfaces as the lowest priority candidates for use by an application for non-operating system critical storage operation data traffic. Block 108 then ranks the physical network interfaces, e.g., by assigning the interfaces to an ordered list, with the marked interfaces being designated with the lowest priority. This ranking may take into consideration not only whether an interface is used for operating system critical storage operations, but also other factors such as relative loads or available bandwidth, suitability for a particular type of traffic, or any other consideration that is typically used in selecting physical network interfaces. Once the ordered list is created, block 110 then attempts to establish communication with the desired resource using the candidate physical network interfaces as ranked in the ordered list. Such attempts may be sequential in nature, or may incorporate concurrency, to accelerate a successful connection, routine 100 is then complete.

As noted above, the aforementioned physical network interface selection process may also be used to assign or link virtual network adapters to physical network adapters, e.g., in a similar manner to that described in the aforementioned cross-referenced patent application.

FIG. 4, for example, illustrates a routine 120 suitable for assigning virtual adapters to physical network interfaces in a manner consistent with the invention. Routine 120 may be called, for example, in response to a request to establish a virtual network link, or whenever a notification is received that operating system critical storage operations are now being accessed over a different physical network interface.

Routine 120 begins in block 122 by determining which storage volume(s) contain critical storage for the operating system, e.g., by calling a suitable operating system-provided API. Next, block 124 determines which physical network interface(s) are providing access to the storage volume(s) containing the critical storage for the operating system, e.g., by calling another operating system-provided API.

Once the physical network interfaces that access critical storage, and thus handle operating system critical storage operations, are determined, block 126 ranks, for each virtual adapter, each physical network interface, setting a higher order bit for each interface that does not handle operating system critical storage operations and clearing the bit for each interface that does handle such operations, thus making those interfaces that do handle operating system critical storage operations lower priority candidates for use by an application for non-operating system critical storage operation data traffic. Block 128 then uses the rankings to select a physical network interface for each virtual network adapter. For example, block 128 may begin a connectivity test (e.g., a TCP connect) for each virtual network adapter to a predetermined participating peer computer over the most highly ranked physical interface, and then after a short delay begin a similar connectivity test over the second most highly ranked interface, etc. The connectivity test that completes first may then be used to determine the physical network interface that virtual adapter will use. Routine 120 is then complete.

The ranking of physical network interfaces in block 126 may be implemented, for example, in a similar manner to the ranking of physical adapters for mapping to virtual adapters in the aforementioned cross-referenced application. For example, as shown in FIG. 5, a rank data structure 140 may be used by block 126, including an NCS_BIT field 141 at a high order bit position to indicate when an interface is "non-critical storage." An NC_BIT field 142, an S9K_BIT field 144, utilization field 146, and initial rank field 148 may be configured similarly to the rank data structure described in the aforementioned cross-referenced application. Given that the NC_BIT field 142 as the most significant bit may be used to indicate sign, and thus assigning negative ranks to all physical adapters that are not candidates for usage by a virtual adapter, the NCS_BIT field 141 may therefore be used to prioritize all eligible physical adapters that do not handle operating system critical storage operations over all physical adapters that do handle such operations. Ranking of physical network interfaces using such a data structure may then proceed in a similar manner to that described in the cross-referenced application.

The assignment of physical network interfaces to handle operating system critical storage operations can also be implemented in a number of manners consistent with the invention. For example, in many instances, operating system critical storage will be assigned to a physical network interface during boot up, and before any applications have been started. In many cases, such assignment will not have to take into account any non-operating system critical storage data traffic. It will be appreciated, however, that in other embodiments, it may be desirable to assign physical network adapters for operating system critical storage data traffic based upon expected loads or available bandwidth, or based on suitability of a particular interface for that task, e.g., in a similar manner described above for non-operating system critical storage data traffic.

Other modifications will be apparent to one of ordinary skill in the art. Therefore, the invention lies in the claims hereinafter appended.

What is claimed is:

1. An apparatus, comprising:
a network;
a network-accessible storage device coupled to the network and storing operating system data; and
a diskless computer coupled to the network, the diskless computer comprising:
a plurality of physical network adapters coupled to the network, a first physical network adapter among the plurality of physical network adapters configured to handle operating system critical storage operations; and
a processing unit coupled to the plurality of physical network adapters and configured to host the operating system and at least one application, wherein the processing unit is configured to direct operating system critical storage operations for the operating system over the first physical network adapter, and wherein the processing unit is further configured to dynamically select a physical network adapter from among the plurality of physical network interfaces to communicate network data for the application by attempting to use the first physical network adapter to communicate the network data for the application only if no other physical network adapter among the plurality of physical network adapters is available to communicate the network data for the application as a result of the first physical network interface being configured to handle operating system critical storage operations, wherein the operating system critical storage operations are selected from the group consisting of system volume-related operations, page swapping-related operations, operations associated with retrieving operating system program code for the operating system, operations associated with retrieving driver program code for the operating system, operations associated with retrieving library program code for the operating system, operations associated with retrieving extension program code for the operating system, operations associated with operating system configuration or registry data, or operations that if delayed adversely impact operating system stability.

2. An apparatus, comprising:
a plurality of physical network interfaces, each physical network interface configured to communicate data over at least one network; and
a processing unit coupled to the plurality of physical network interfaces and configured to host an operating system and at least one application, wherein the processing unit is configured to direct operating system critical storage operations for the operating system over at least one of the plurality of physical network interfaces to access a network-accessible storage device, and wherein the processing unit is further configured to dynamically select at least one of the plurality of physical network interfaces to communicate network data for the application by prioritizing at least one physical network interface that does not handle operating system critical storage operations over at least one physical network interface that does handle operating system critical storage operations, wherein the operating system critical storage operations are selected from the group consisting of system volume-related operations, page swapping-related operations, operations associated with retrieving operating system program code for the operating system, operations associated with retrieving driver program code for the operating system, operations associated with retrieving library program code for the operating system, operations associated with retrieving extension program code for the operating system, operations associated with operating system configuration or registry data, or operations that if delayed adversely impact operating system stability.

3. The apparatus of claim 2, wherein each of the physical network interfaces is disposed in a physical network adapter.

4. The apparatus of claim 2, wherein the plurality of physical network interfaces are coupled to a common network.

5. The apparatus of claim 4, wherein the plurality of physical network interfaces are coupled to an Ethernet network, and wherein the network data for the application is communicated via an Ethernet protocol.

6. The apparatus of claim 5, wherein the common network includes a storage area network to which the network-accessible storage device is coupled, and wherein the operating system critical storage operations are communicated via a network storage protocol that is different from a protocol by which the network data for the application is communicated.

7. The apparatus of claim 6, wherein the operating system critical storage operations are communicated via an iSCSI protocol.

8. The apparatus of claim 2, further comprising a diskless computer system within which the processing unit and the plurality of physical network interfaces are disposed.

9. The apparatus of claim 2, wherein the processing unit is configured to dynamically select at least one of the plurality of physical network interfaces to communicate network data for the application by prioritizing every physical network interface among the plurality of physical network interfaces that does not handle operating system critical storage operations over every physical network interface among the plurality of physical network interfaces that does handle operating system critical storage operations.

10. The apparatus of claim 2, wherein the processing unit is configured to generate an ordered list of physical network interfaces that the processing unit uses to dynamically select a physical network interface to communicate network data for the application, and wherein the processing unit is configured to prioritize a first physical network interface that does not handle operating system critical storage operations over a second physical network interface that does handle operating system critical storage operations by ordering the first physical network interface earlier in the ordered list than the second physical network interface.

11. The apparatus of claim 10, wherein the processing unit is configured to order the second physical network interface last in the ordered list as a result of the second physical network interface being configured to handle operating system critical storage operations.

12. The apparatus of claim 11, wherein the processing unit is further configured to configure the second physical network interface to handle operating system critical storage operations, and, in association with generating the ordered list, to determine that the second physical network interface is configured to handle operating system critical storage operations.

13. The apparatus of claim 10, wherein the processing unit is configured to dynamically select a physical network interface by sequentially attempting to use each physical network interface according to the ordered list.

14. The apparatus of claim 2, wherein the processing unit is configured to dynamically select a physical network interface in response to a request to communicate network data for the application.

15. The apparatus of claim 2, wherein the processing unit is configured to dynamically select a physical network interface in response to a request to link a virtual network adapter to a physical network interface.

16. The apparatus of claim 2, wherein the operating system critical storage operations include paging operations.

17. The apparatus of claim 2, wherein the network-accessible storage device is of the type upon which a system volume for the operating system resides, wherein the operating system critical storage operations include system volume storage operations.

18. A method of communicating data, the method comprising, in an apparatus of the type including a plurality of physical network interfaces that are each configured to communicate data over at least one network and a processing unit coupled to the plurality of physical network interfaces and configured to host an operating system and at least one application:

directing operating system critical storage operations for the operating system over at least one of the plurality of physical network interfaces, the at least one of the plurality of physical network interfaces accessing a network-accessible storage device, wherein the operating system critical storage operations are selected from the group consisting of system volume-related operations, page swapping-related operations, operations associated with retrieving operating system program code for the operating system, operations associated with retrieving driver program code for the operating system, operations associated with retrieving library program code for the operating system, operations associated with retrieving extension program code for the operating system, operations associated with operating system configuration or registry data, or operations that if delayed adversely impact operating system stability; and dynamically selecting at least one of the plurality of physical network interfaces to communicate network data for the application by prioritizing at least one physical network interface that does not handle operating system critical storage operations over at least one physical network interface that does handle operating system critical storage operations, the dynamically selected at least one of the plurality of physical network interfaces communicating the network data for the application.

19. The method of claim 18, wherein the apparatus comprises a diskless computer system within which the processing unit and the plurality of physical network interfaces are disposed, wherein each of the physical network interfaces is disposed in a physical network adapter, wherein the plurality of physical network interfaces are coupled to a common Ethernet network that includes a storage area network to which the network-accessible storage device is coupled, and wherein the operating system critical storage operations are communicated via an iSCSI protocol.

20. The method of claim 18, wherein dynamically selecting at least one of the plurality of physical network interfaces to communicate network data for the application includes prioritizing every physical network interface among the plurality of physical network interfaces that does not handle operating system critical storage operations over every physical network interface among the plurality of physical network interfaces that does handle operating system critical storage operations.

21. The method of claim 18, further comprising generating an ordered list of physical network interfaces for use in dynamically selecting a physical network interface to communicate network data for the application, including ordering a physical network interface that handles operating system critical storage operations last in the ordered list, wherein dynamically selecting a physical network interface includes sequentially attempting to use each physical network interface according to the ordered list.

22. The method of claim 21, further comprising:
configuring the second physical network interface to handle operating system critical storage operations; and
in association with generating the ordered list, determining that the second physical network interface is configured to handle operating system critical storage operations.

23. The method of claim 18, wherein dynamically selecting a physical network interface is performed in response to at least one of a request to communicate network data for the application and a request to link a virtual network adapter to a physical network interface.

24. The method of claim 18, wherein the operating system critical storage operations include at least one of paging operations and system volume storage operations directed to a system volume for the operating system that resides on the network-accessible storage device.

25. A program product, comprising:
program code configured to be executed in an apparatus of the type including a plurality of physical network interfaces that are each configured to communicate data over at least one network and a processing unit coupled to the plurality of physical network interfaces and configured to host an operating system and at least one application, and to direct operating system critical storage operations for the operating system over at least one of the plurality of physical network interfaces to access a network-accessible storage device, the program code configured to dynamically select at least one of the plurality of physical network interfaces to communicate network data for the application by prioritizing at least one physical network interface that does not handle operating system critical storage operations over at least one physical network interface that does handle operating system critical storage operations, wherein the operating system critical storage operations are selected from the group consisting of system volume-related operations, page swapping-related operations, operations associated with retrieving operating system program code for the operating system, operations associated with retrieving driver program code for the operating system, operations associated with retrieving library program code for the operating system, operations associated with retrieving extension program code for the operating system, operations associated with operating system configuration or registry data, or operations that if delayed adversely impact operating system stability; and
a recordable type non-transitory computer readable medium storing the program code.

* * * * *